(12) United States Patent
Virippil et al.

(10) Patent No.: US 6,478,141 B2
(45) Date of Patent: *Nov. 12, 2002

(54) AUTOMATED CONVEYOR CLEANING SYSTEM

(75) Inventors: Manoj Virippil, Sioux City, IA (US); Shaughn M. Benson, Pierson, IA (US); Andrew R. Hubbert, Denver, CO (US); Keith A. Blei, Oakland, CA (US)

(73) Assignee: IBP, inc., Dakota Dunes, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/004,369

(22) Filed: Nov. 1, 2001

(65) Prior Publication Data

US 2002/0038755 A1 Apr. 4, 2002

Related U.S. Application Data

(62) Division of application No. 09/501,409, filed on Feb. 10, 2000, now Pat. No. 6,360,874.

(51) Int. Cl.[7] ............................................... B65G 45/22
(52) U.S. Cl. ........................ 198/495; 198/842; 198/866
(58) Field of Search ................................ 198/495, 500, 198/842, 866

(56) References Cited

U.S. PATENT DOCUMENTS

| | | | |
|---|---|---|---|
| 2,855,094 A | 10/1958 | Zebarth | |
| 4,007,827 A | 2/1977 | Mattos | |
| 4,087,320 A | * 5/1978 | Danahy et al. | 198/495 |
| 4,627,457 A | 12/1986 | Bird et al. | |
| 4,978,000 A | 12/1990 | Mohr | |
| 5,372,243 A | 12/1994 | King | |
| 5,798,761 A | 6/1998 | Selbertinger et al. | |
| 6,109,428 A | 8/2000 | Harm | |
| 6,193,052 B1 | * 2/2001 | Cloud et al. | 198/866 |
| 6,302,263 B1 | * 10/2001 | Bennett et al. | 198/495 |

* cited by examiner

*Primary Examiner*—Joseph E. Valenza
(74) *Attorney, Agent, or Firm*—Blackwell Sanders Peper Martin LLP; Mark E. Stallion

(57) ABSTRACT

An automated cleaning system for an endless belt conveyor. The cleaning system having a central control which controls pump supplying hot water, soap and a sanitizer to a plurality of controllable spray valves for plural spray bars.

14 Claims, 8 Drawing Sheets

AUTOMATED CONVEYOR CLEANING SYSTEM

CROSS REFERENCE TO RELATED APPLICATION

This application is a Division of Application Ser. No. 09/501,409, filed on Feb. 10, 2000 now U.S. Pat. No. 6,360,874.

FIELD OF THE INVENTION

The present invention relates to automated cleaning systems and more particularly to such a cleaning system for conveyors and conveyor belts such as those used in food processing plants.

BACKGROUND OF THE INVENTION

Meat processing and other food packaging plants have a multitude of conveyor systems that must be cleaned at least nightly in accordance with government regulations. In the past, workers have brought carts onto the plant floor with long hoses to clean the conveyors manually. The process consisted of 1) rinsing the conveyors with high pressure hot water (~140° F. @ 250 psi); 2) covering the conveyor with an industrial strength soap solution; 3) repeating the high pressure hot water rinse to clear off the soap; 4) lifting the belts out of the conveyors so the aprons surrounding the conveyors and the belt guides underneath can be cleaned; 5) repeating the high pressure hot water rinse to clear off any debris removed from the aprons or guides; 6) spraying a sanitizing solution on the conveyor.

Due to the stringent government regulations, this process is relatively standard in the food processing industry, although some variations may exist. The manual process does have several limitations, most obvious of which is amount of labor and time required for the process. The labor and time required to clean all of the conveyors in a single food processing plant will vary greatly depending on the number and length of the conveyors in the plant, but a typical plant is generally cleaned once per day.

SUMMARY OF THE INVENTION

In accordance with the objects listed above, the present invention is an automated conveyor cleaning system that performs most of the conventional conveyor cleaning steps without significant user intervention. The system involves outfitting the food processing plant with centralized high-pressure pumps, a chemical integration platform ("CIP"), and a plurality of strategically placed nozzle spray bars. The high-pressure pump allows for the rinse cycles to be performed at pressures higher than those used with a manual system.

The steps of the present invention are similar to those outlined above for a conventional system. The belts are first subjected to a high-pressure hot water rinse sent through the spray bars and nozzles by the central pumps. The same spray bars and nozzles are then used to coat the belts with detergent foam, after which the rinsing step is repeated. At this step the automated portion of the system pauses, so that the belts can be lifted out for cleaning underneath the belts and the conveyor aprons that surround the belts. To further aid the system, special lifters are used with certain types of conveyor belts to lift the belts out of the conveyor.

Once the side aprons are cleaned and the belts are returned to their operating location, the automated process continues with a high-pressure rerinsing to remove any debris left during the cleaning of the aprons or other manual cleaning. The spray bars then coat the belt with a low-pressure spray of sanitizing solution, which Is allowed to dry In place. Preferably the spray bars are then purged with pressurized air to remove any excess sanitizer in the spray bars.

Programmable logic controllers ("PLCs") are used with the CIP, with the inlet valves of the spray bars, and with the high-pressure pumps. The conveyors (that have some common properties) are grouped together and each such group is controlled by a PLC. For each plant there could be many such groups called zones. The PLCs are all networked, possibly by a proprietary fiber optic system or wireless Ethernet and are in turn networked with a supervisory control system (typically run on an NT PC). This allows for logging of the various parameters used for cleaning (i.e. temperatures, pressure, time) and the amount of water or chemicals used.

The system can also easily change the dilution rate for the chemicals (stored in bulk) at the CIP. The CIP will typically have three bulk chemicals connected thereto: an industrial soap, and two types of sanitizers (the sanitizers are alternated based on the bacteria type and its resistance to the sanitizer), and is capable of supplying the diluted chemicals to the entire plant. The operation of the high-pressure pumps is preferably driven, by variable frequency drives ("VFD") and controlled by one of the PLCs mentioned above.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein.

DETAILED DESCRIPTION OF THE INVENTION

Figure 1:
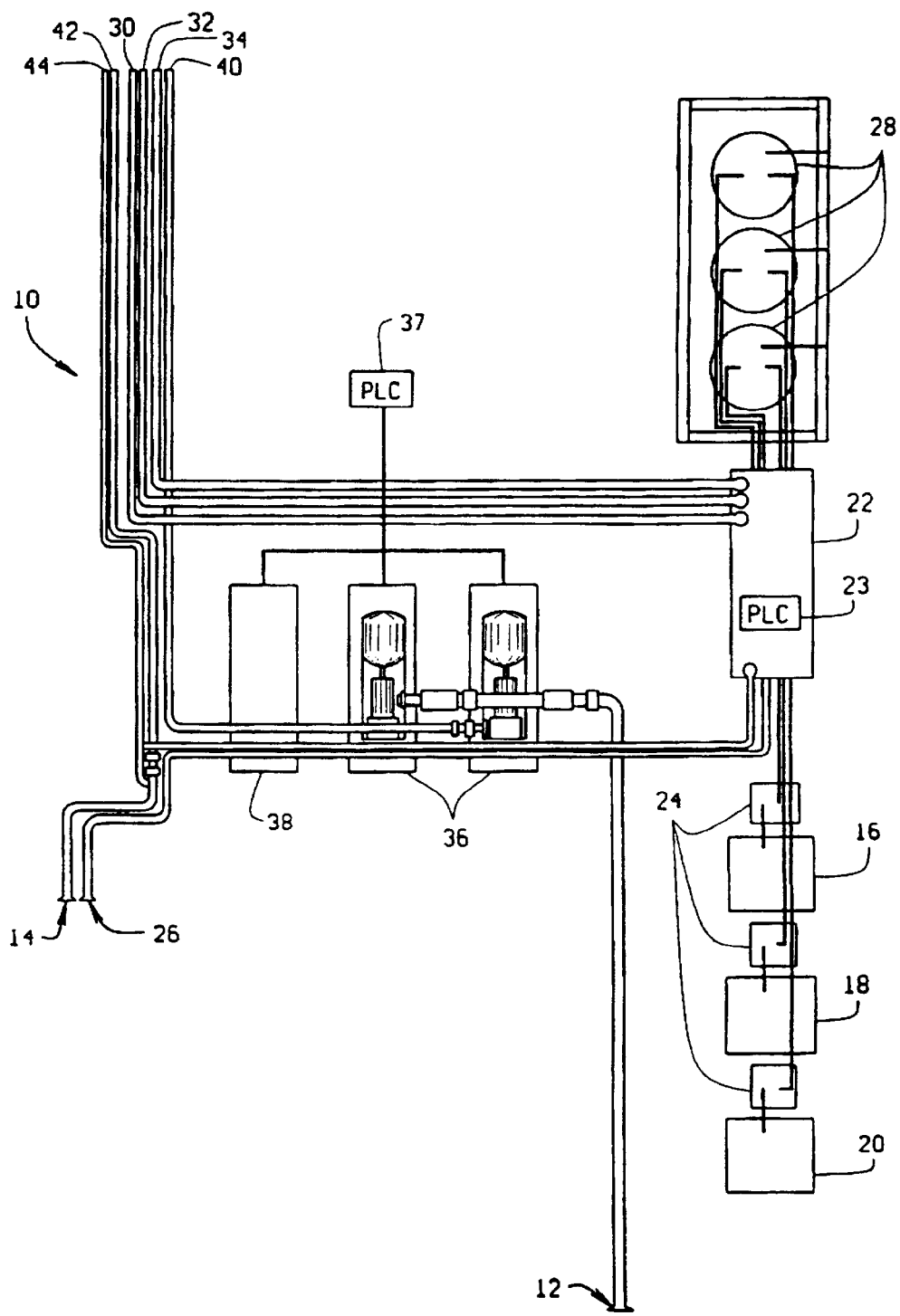
FIG. 1 is a schematic view of the central facilities used in the present invention.

Referring now to FIG. 1 the central facilities 10 of the present system are shown in schematic form. The central facilities 10 supply the necessary resources to an entire food processing plant for the present system to function, although it is conceivable to maintain a second or subsequent set of central facilities either as a redundant backup system or to divide the plant into two sections, each set of central facilities maintaining one section. It is preferable, however, to maintain only a single set of central facilities 10 to retain simplicity, as the central facilities 10 can be expanded to increase capacity plant-wide.

The central facilities 10 comprise sources for each of the resources used by the system. Namely, there exists a hot water source 12, a compressed air source 14, and a plurality of bulk chemical sources 16, 18, 20. It is possible to keep the resource sources in a different physical location from the remainder of the central facilities 10, although it is preferable to keep the bulk chemical sources 16, 18, 20 nearby.

As described below, the typical bulk chemicals in the preferred embodiment will comprise an industrial strength detergent 16, and two sanitizers—one acidic 18 and one basic 20. The bulk chemical sources are in communication with a chemical integration platform ("CIP") 22. The CIP 22 comprises a conglomeration of pumps, a programmable logic controller ("PLC") 23, instrumentation (i.e. sensors and meters), and starters located typically on a single skid. The CIP 22 obtains concentrated chemical from the bulk sources 16, 18, 20, possibly with the aid of transfer pumps 24. It also receives water from a cool water source 26 to dilute with the concentrated chemical and keeps an ample supply of each chemical prediluted in batch tanks 28. The PLC 23 monitors the level of diluted chemical in the batch tanks 28 and dilutes more as needed. The CIP 22 also contains the pumps to pump the diluted chemical from the batch tanks 28 to the remainder of the plant through the output lines 30, 32, 34. In the prior art manual cleaning method, these chemicals would have to be manually prediluted and transported in the batch tanks to the various conveyor systems.

Also located in the central facilities 10 are high-pressure pumps 36 for the hot water supply 12. Space may be reserved in the central facilities for additional pumps, in the event, for example, that plant capacity is expanded. In a similar manner, the types and quantities of chemicals may also be expanded. FIG. 1 shows an example of central facilities 10 having two pumps 36 and space reserved 38 for one additional pump 36 in the event of future expansion. Like the CIP 22, the hot water pumps 36 will have a PLC 37 attached thereto controlling the pumps' operation. The water in the hot water supply 12 should preferably be between 100° F. and 180° F. and the pumps 36 should preferably maintain the plant's supply of hot water at least 300 psi. Current governmental regulations require water temperature of less than 180° F. for safety reasons. Applicants have found that 140° F. is optimal, given current regulations. However, should regulations change, hotter water temperatures would be preferable and are within the scope of the present invention. Applicants have also found that 500 psi water pressure is optimal for the present invention, however, higher pressures may be used. The pumps 36 supply hot water to the plant through the output line 40, and should preferably use variable frequency drives ("VFD"). The centralized pumps 36 allow for significantly higher pressure water to be used than what is safely obtainable using a manual cleaning system. Furthermore, it is conceivable to have the pumps 36 pump cold water for rinsing during some stages of the cleaning process to save money and reduce condensation in the plant.

The compressed air is directed from its supply 14 straight to the output line 42, and on to the remainder of the plant. A portion of this air, however, may possibly be diverted to the CIP 22 for its use and to a separate output line 44 for instrumentation use.

Figure 2:
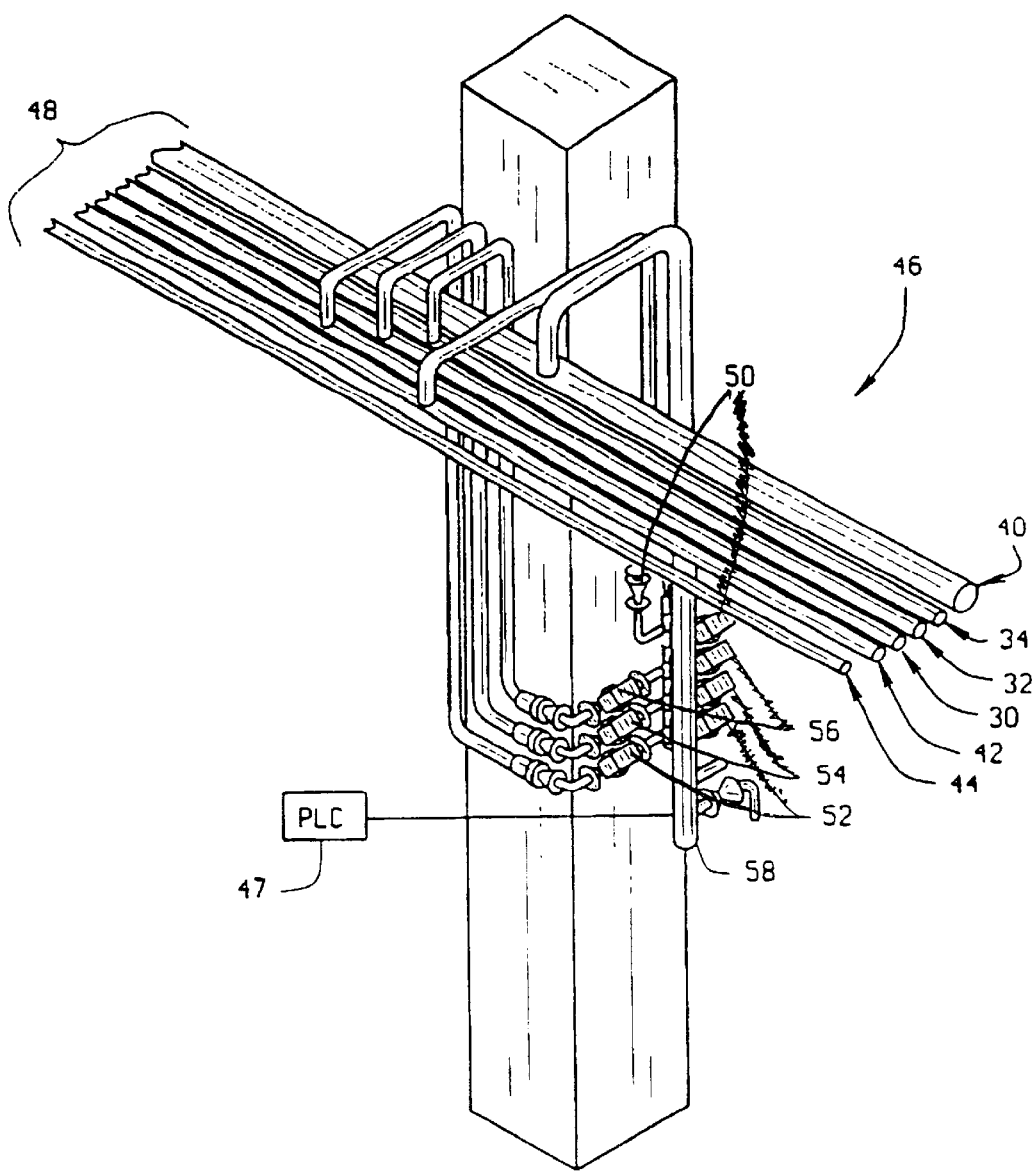
FIG. 2 is an isometric view of a typical manifold station used in the present invention.

Referring now to FIG. 2, a typical manifold station 46 for the preferred system is shown. A plurality of these manifold stations 46 are dispersed throughout the plant. The manifold station 46 taps each of the supply lines 48, which run throughout the plant. There are typically six supply lines 48, one for each output line (30, 32, 34, 40, 42, 44) located at the central facilities. Each manifold station 46 will typically have four valves one for the hot water supply 50, and one for each of the three diluted chemical types 52, 54, 56. The manifold station 46 should preferably have a single manifold drain 58. Additionally, each manifold station will have backflow prevention (not shown) to protect the potable water supply. Such backflow prevention is well-known in the art. Each manifold station 46 is controlled by a nearby PLC 47, although multiple manifold stations 46 may be controlled by a single PLC 47. In the preferred embodiment the plant is divided into a few separate zones, each manifold station belonging to exactly one zone, and each zone having exactly one PLC 47. This arrangement allows for the conveyors in one section of the plant to be cleaned while the remainder of the plant stays operational.

Figure 11:
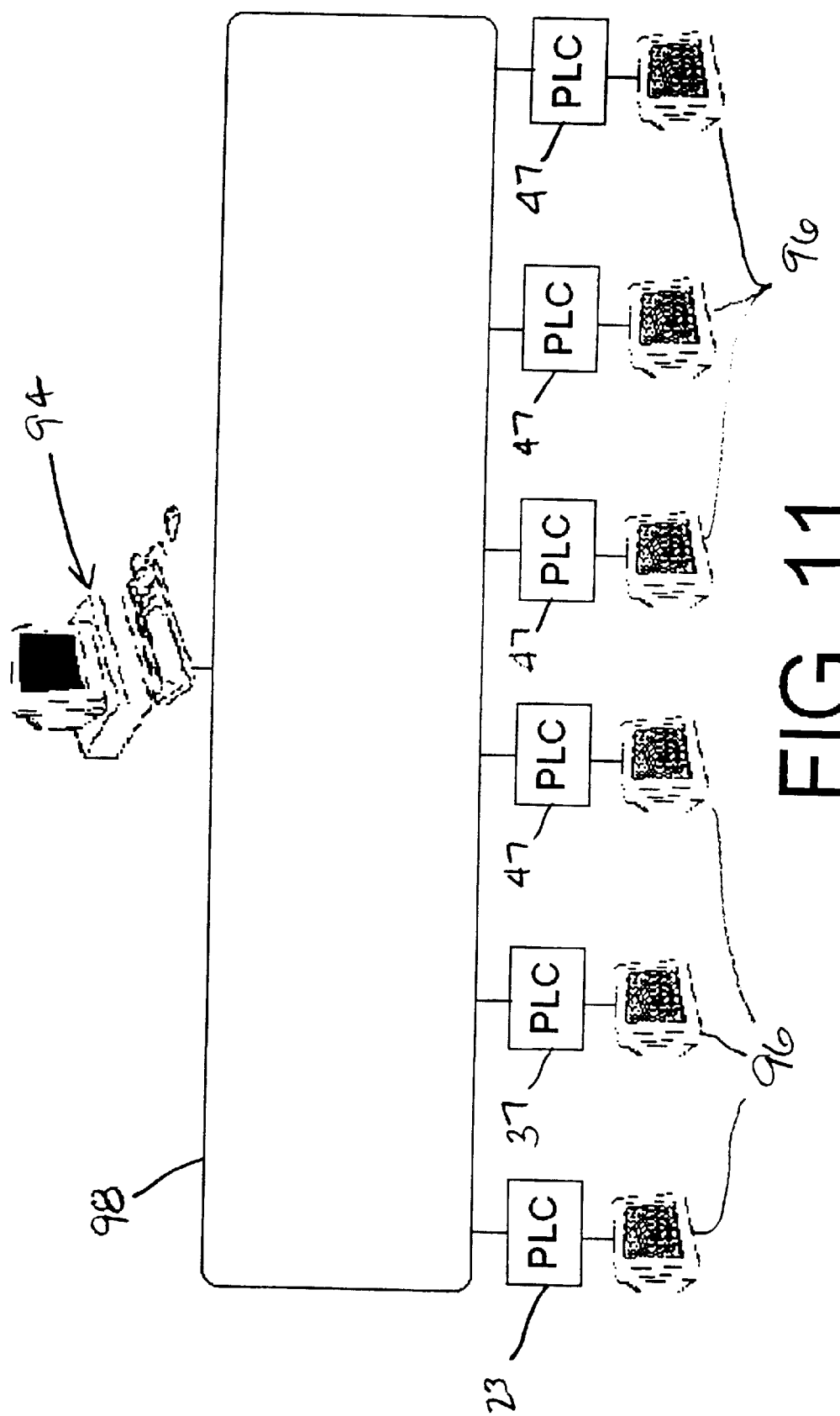
FIG. 11 is a system block diagram showing the SCADA and its connection to the system PLCs.

The PLC's 47 used to control the manifold stations 46, as well as the PLC 37 for the hot water pumps 36 and the PLC 23 for the CIP 22 can be any off-the-shelf type of PLC that is readily available. The inventors have found that the Momentum™ available from the Modicon® Corporation of Andover, Mass. is particularly suitable for the present invention. The PLC's are all interconnected and in communication with a supervisory control and data acquisition (SCADA) unit 94. The connection between the PLC's and the SCADA 94 may be made by any conventional networking architecture, such as Modbus, Ethernet, or DeviceNet or any similar proprietary architecture. Each PLC preferably also has an operator panel 96 connected thereto. FIG. 11 shows a typical system block diagram of the interconnection of the SCADA 94, the PLCs, and the operator panels 96, connected with a ring network 98.

The SCADA 94 can take the form of a simple controller with input mechanisms as simple as a touch keypad. The preferred embodiment of the SCADA 94 is, however, a computer workstation, such as one based on an Intel® architecture running Microsoft® Windows® NT/2000 and SCADA software, such as that available from Intellution, Inc. of Norwood, Mass. The PLC's are programmed with logic controller software, such as ProWorx NxT® available from Taylor Industrial Software of Edmonton, AB. The SCADA is responsible for sending control signals to the various PLCs as is described in further detail below. In case of a SCADA failure, the system may be operated directly from each PLC individually, for example by use of an operator panel 96.

Figure 5:
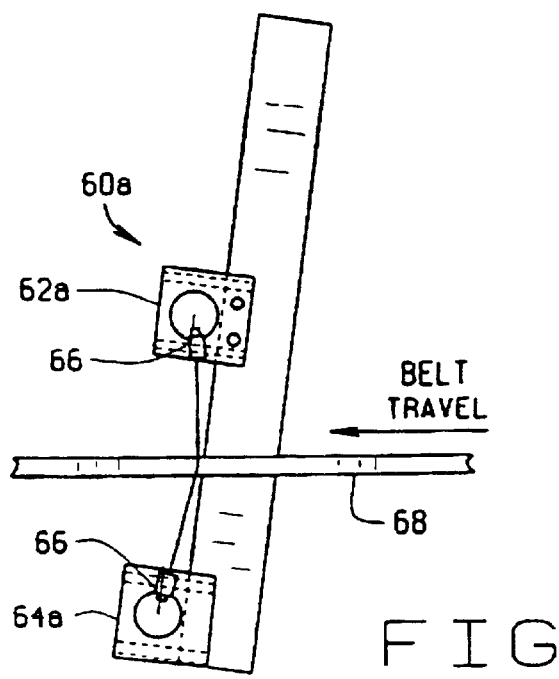
FIG. 5 is a side view of an alternate spray bar used in the present invention, showing its relation to a conveyor belt.
Figure 6:
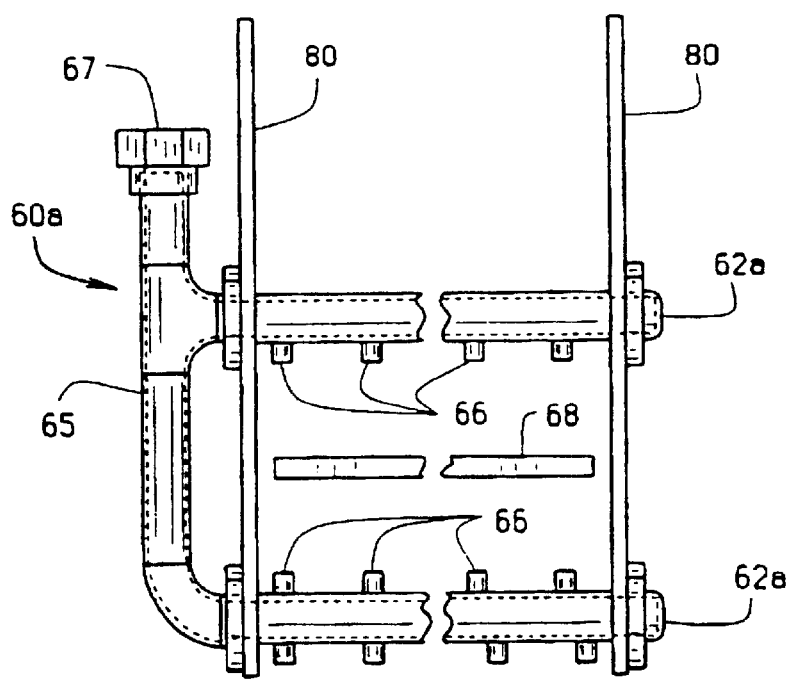
FIG. 6 is a front view of the spray bar shown in FIG. 5.
Figure 7:
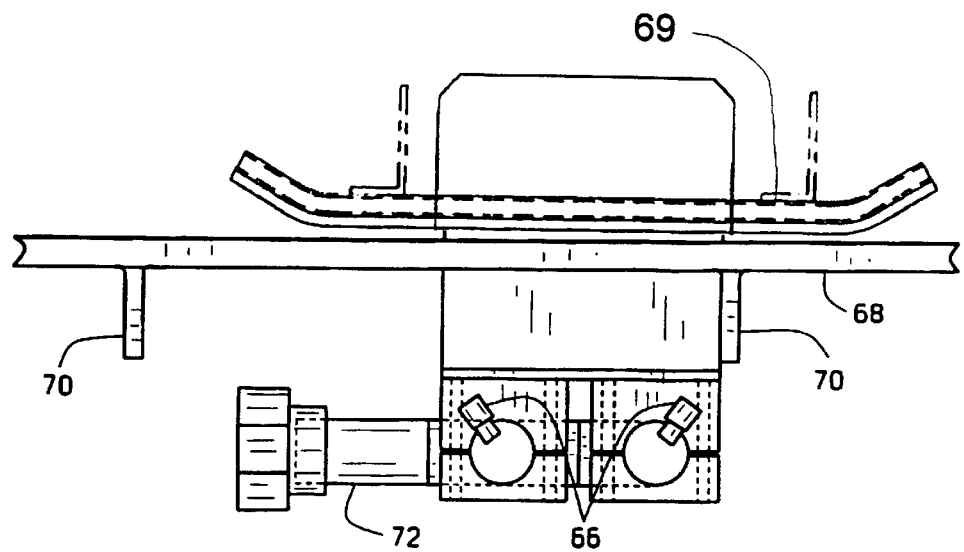
FIG. 7 is a close-up side view of nozzles on a secondary spray bar for use with cleated conveyor belts in the present invention.

Connected to each manifold station 46 is a plurality of spray bars 60, 60a. A typical spray bar 60 can be shown in FIGS. 3 and 4, or an alternative embodiment 60a is shown in FIGS. 5 and 6. The preferred spray bar 60, 60a will have an upper 62, 62a and lower leg 64, 64a, each leg having a plurality of nozzles 66. The spray bars 60, 60a are preferably mounted to the underside of a conveyor system such that the legs straddle the conveyor belt 68 as it moves in the inverted or underside position (that is the carrying surface of the belt 68 is faced down). This allows the spray bars 60, 60a to be permanently mounted without obstructing flow of product on the belt 68. Each conveyor belt 68 will have at least one spray bar 60, 60a. Certain belt configurations, such as those with cleats 70, will have an additional spray bar 72 designed specifically to clean the cleats 70. An example of such a configuration is shown in FIG. 7. As can also be seen in FIG. 7, a guide 69 may be used to constrain the conveyor belt 68 during spraying.

The nozzles 66 of the lower leg 64, 64*a* of the spray bar 60, 60*a* are preferably angled against the direction of movement of the belt 68 to create a cutting effect with the hot water, however such angling is not required to practice the invention. If an angle is used, it will be slight, but the optimal angle will vary with the conveyor configuration. For example, a flattop belt may use an angle in the vicinity of 15° and a typical angle for a cleated belt may be in the vicinity of 35° (from vertical). FIG. 7 shows the nozzles 66 configured to clean the cleats 70 on the belts 68 so equipped. The angles of the nozzles 66 for cleaning the cleats 70 are typically greater than the main lower nozzles 66, but the angle will vary depending on the size of the cleat. When the secondary spray bars 72 are used for cleated belts, they should preferably be located near (between 2 and 3 feet) the primary spray bar 60, 60*a*.

Figure 3:
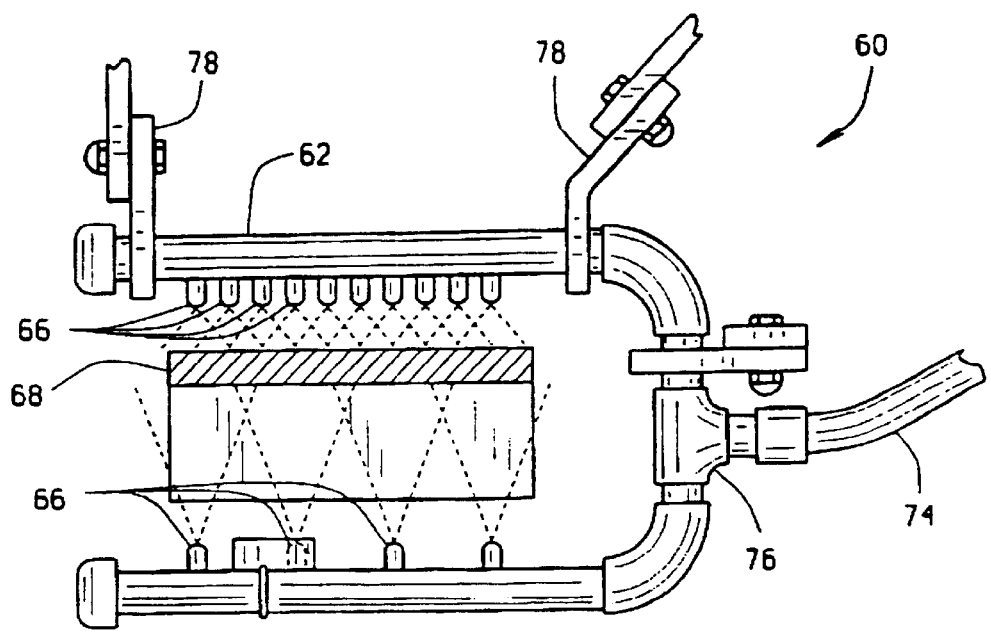
FIG. 3 is a front view of a spray bar used in the present invention, showing its relation to a conveyor belt.
Figure 4:
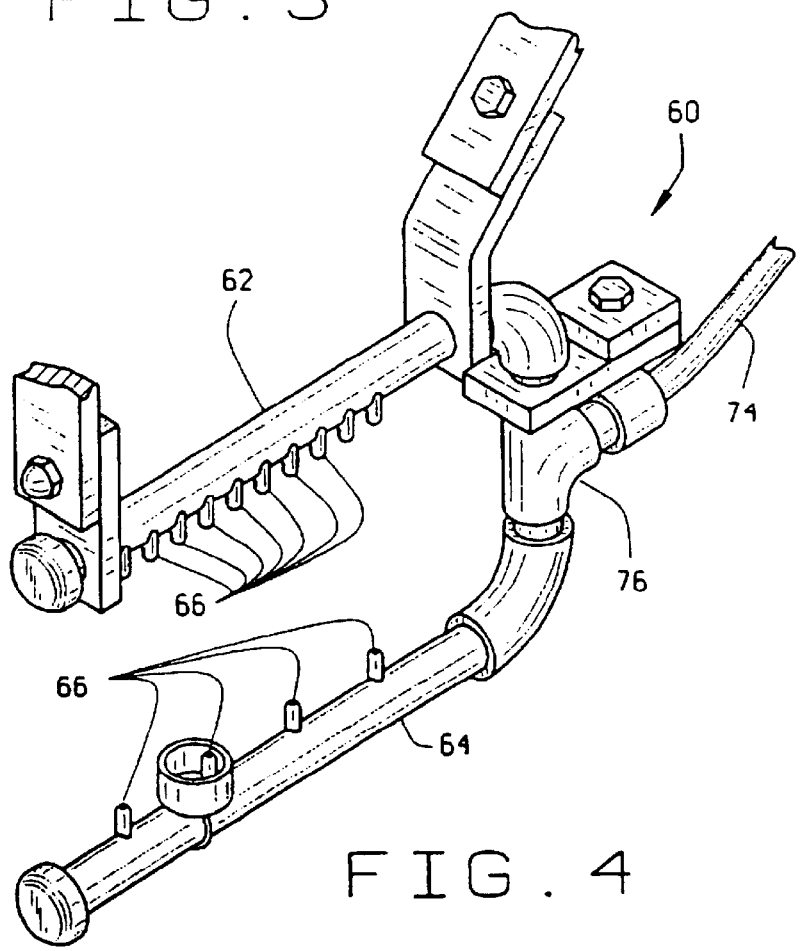
FIG. 4 is an isometric view of the spray bar shown in FIG. 3.

FIGS. 3 and 4 show one embodiment of the spray bar 60. In this embodiment a flexible hose 74 pending from the manifold station 46 delivers whatever resource is provided there. The hose 74 leads into a "T" connector 76, which simultaneously supplies the upper and lower legs 62, 64 of the spray bar 60. The upper leg 62 of the spray bar 60 is passed through retainers 78 connected to the conveyor, one proximate to the "T" connector 76 and one distal thereto.

An alternate spray bar 60*a* is shown in FIGS. 5 and 6. In this embodiment both legs 62*a*, 64*a* of the spray bar 60*a* are connected by a hard pipe 65 to the inlet 67 of the spray bar 60*a*. This provides a more durable connection than the embodiment shown in FIGS. 3 and 4. As can also be seen in FIG. 6, both the lower and upper legs 62*a*, 64*a* of the spray bar 60*a* are retained by the conveyor 80, both proximate and distal to the spray bar inlet 67. It can also be seen from FIG. 5 that the lower leg 62*a* of the spray bar 60*a* is offset downstream (in relation to the belt travel) from the upper leg 64*a*. This allows the nozzles 66 on the upper leg 62*a* to be aimed straight downward and the nozzles 66 on the lower leg 64*a* to be angled as previously discussed, and still contact the belt 68 at the same point but on opposing surfaces.

Figure 9:
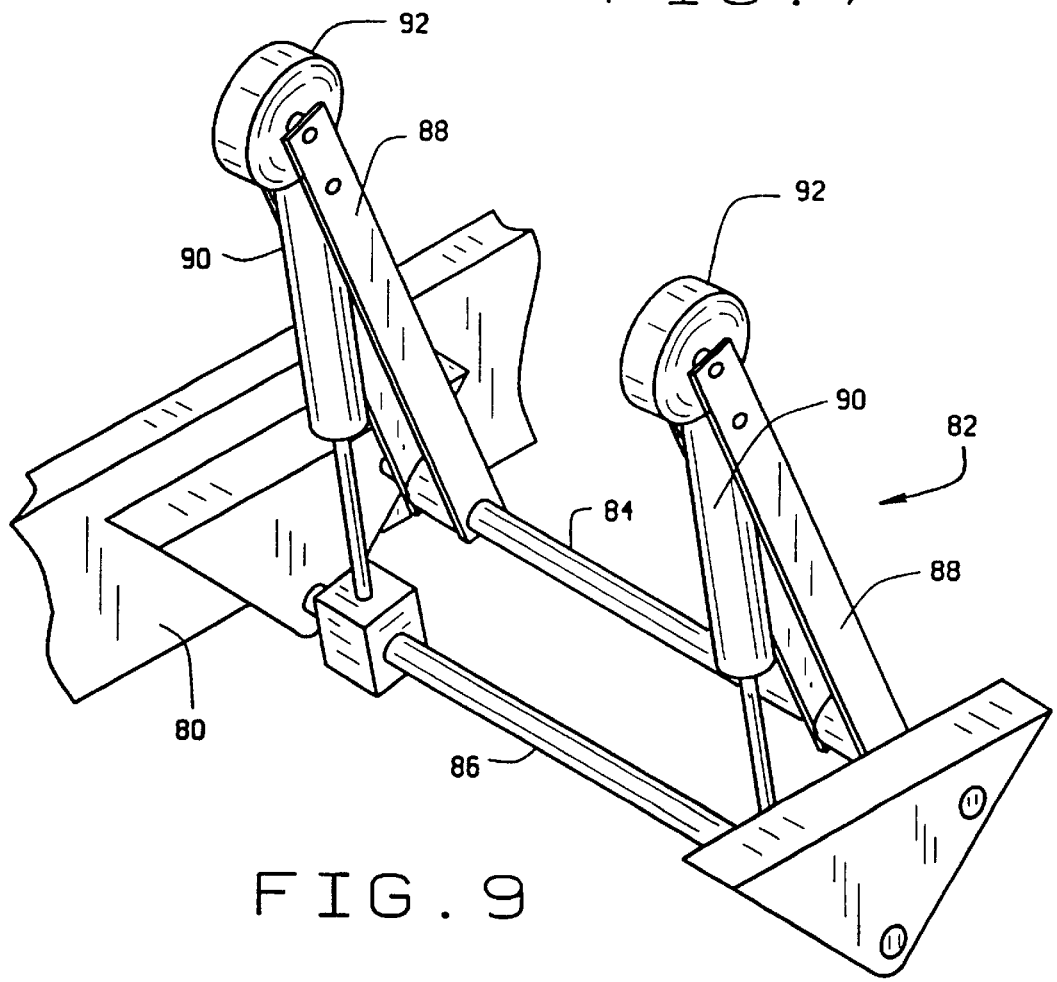
FIG. 9 is an isometric view of the belt lifters shown in FIG. 8 in an extended state.
Figure 8:
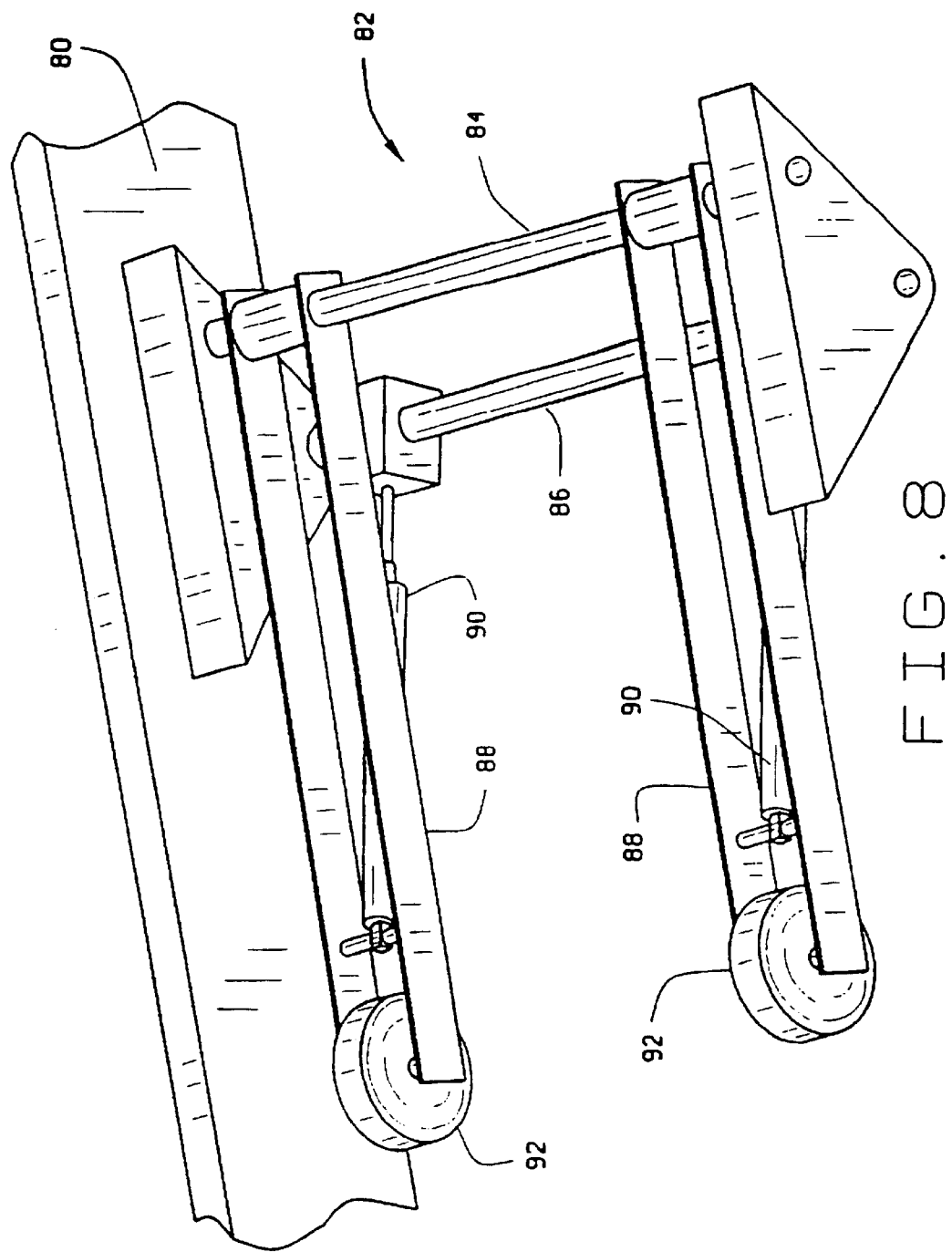
FIG. 8 is an isometric view of belt lifters in a resting state for use with the present invention.
Figure 10:
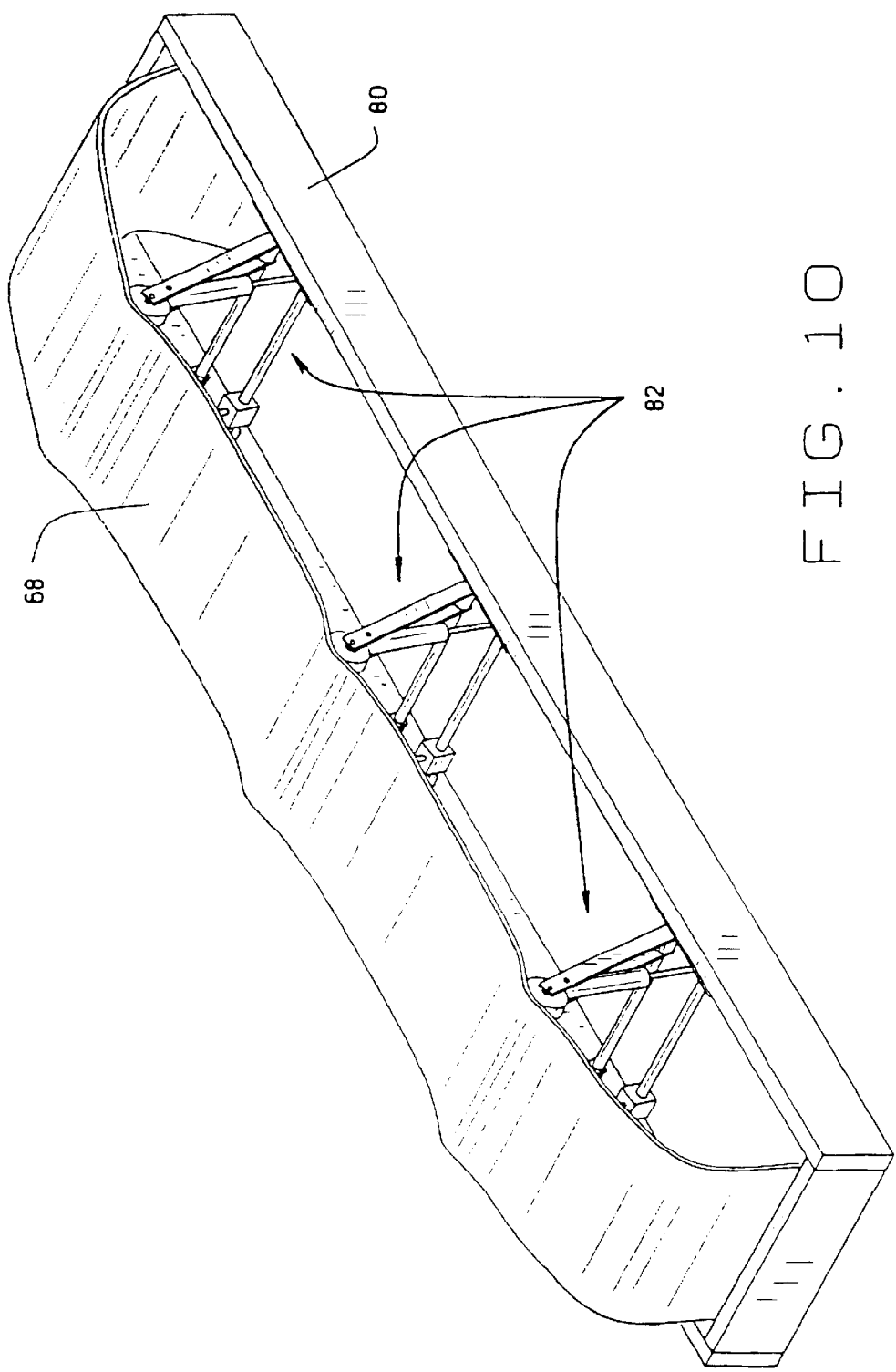
FIG. 10 is an isometric view of the belt lifters shown in FIG. 9 in operation in relation to a conveyor system.

With most conveyors there will also be a belt lifting apparatus 82 displayed in FIGS. 8–10. The belt lifting apparatus 82 is used in the majority of conveyors 80 except those without sufficient slack to be lifted, such as metal belts. FIG. 8 shows the belt lifters 82 in the resting (or contracting) state, which is used during normal operation and during the automated phases of the cleaning cycle. The belt lifter 82 comprises a pair of axles 84, 86, a pair of pivot arms 88 that rotate about one axle 84, a pair of extenders 90 that rotate about the other axle 86, and a pair of rollers 92 located at the end of the pivot arms 88 respectively. The extenders 90 are coupled respectively to the pivot arms 88, and are preferably pneumatically controlled, although a hydraulic or electrical arrangement would also be feasible. Depending on belt width, the belt lifter 82 may comprise only a single pivot arm 88, extender 90, and roller 92 (for narrow belts) or more than two pivot arms 88, extenders 90, and rollers 92 (for wider belts). For safety reasons, it is desirable to have the actuation of the extenders 90, and thereby the belt lifters 82, spread over several seconds.

During the manual cleaning phase of the present system (described in more detail below) the extenders 90 are extended from their contracted resting state. This extended state is shown in FIG. 9. The extenders 90 are noticeably closer in length to the pivot arms 88 when in the extended state than when in the resting state. Each belt 68 on which belt lifters 82 are used will have more than one belt lifter 82. An example belt 68 with the belt lifters 82 in the extended state is shown in FIG. 10. As readily seen from the drawings, the slack of the belt 68 is taken up by the rollers 92 and the apron of the conveyor 80, as well as other components normally hidden under the belt 68, are exposed for manual cleaning.

For safety reasons, it is not recommended to have the extenders 90 activated by the SCADA unit 94, but this arrangement is possible. In the preferred embodiment, the control for pneumatically activating the extenders is located in each zone at the operator panel 96.

The entire system has two modes of operation—sequential and automated. In a typical automated mode, an operator located at the SCADA unit 94 indicates which zones are to be cleaned. The SCADA 94 sends a signal to the PLC 37 for the hot water pumps 36 to start. Once the pumps are started, the SCADA 94 sends a signal to the PLC 47 for the manifold stations 46 in the zone(s) to be cleaned to commence the initial phases. The initial phases consist of rinsing the belt 68 with the high-pressure hot water, covering the belt 68 with foam from a low pressure spray of the industrial detergent 16, and repeating the high-pressure rinsing phase to remove the foam. The PLC 47 for a zone to be cleaned receives those signals and opens the valves 50 for the hot water for predetermined length of time, then closes the hot water valves 60 and opens the detergent valves 52. After another predetermined length of time, the PLC 47 closes the detergent valves 52 and reopens the hot water valves 50. Applicants recommend that the belts undergo between one and four revolutions of the belt 68 during each spray cycle. The PLC 47 may also open the valves in its zone sequentially so that only a portion of its spray bars 60 are active at any given time.

Once the initial phases are completed in the automated mode, it is preferable for the operator to lock out the conveyors, so that the conveyor belts 68 in the zones being cleaned will not run, but it is possible to operate the belt lifters 82 while the belts 68 are running. For belts 68 equipped with belt lifters 82, the belt lifters 82 are activated lifting the slack in the belts 68 out of the conveyor 80. Certain types of belts 68, such as those made of metal, without sufficient slack, are left in place. Cleaning personnel then use conventional cleaning methods to manually clean components of the conveyor 80 other than the belt 68. This includes the conveyor apron and the components under the belt 68 normally hidden from sight. This method of lifting the belts 68 is unquestionably safer and quicker than the prior art method of using crowbars to pry the belts out of the conveyor system. In the case of belts 68 without sufficient slack for belt lifters, manually cleaning of the aprons is done with the belts in place.

Once the manual cleaning phase is completed, the belt lifters 82 are returned to their resting state and, if the belts 68 are locked, the operator unlocks them. The operator indicates at the SCADA 94 that the final phases are to commence. The final phases consist of again rinsing the belts 68 to remove any debris loosened during the manual phase and a sanitizing phase. The rinsing phase is carried out identically to the previous rinsing phases, whereby the zone PLC 47 opens the hot water valves 50 at the manifold stations 46, either in unison or sequentially. The PLC 47 then closes the hot water valves 50 and opens the appropriate sanitizing valves 54, 56. The SCADA 94 will signal the PLCs 23, 47 which sanitizer is to be used. The preferred embodiment is a system having two sanitizer types although more or fewer may be used. When two are used one may be acidic 18 and the other may be basic 20. This rotation of sanitizer type is intended to prevent the formation of resistant strains of bacteria that adapt to one type of sanitizer, and is well-known in the art. Optimally, a final step may be included, whereby after PLC 47 closes the sanitizer valve 54, 56, it opens manifold drain 58 for a period of time to release any fluids trapped in the manifold station 46. The PLC 47 would then close the manifold drain 58 and purge the spray bars 60, 60a with air from the compressed air source 14. The purging prevents clogging of the nozzles 66 and prevents sanitizer from dripping on the belts 68 during operation.

The chemicals are preferably sprayed at a low pressure that ideally ranges from 5 to 100 psi. Applicants have found that approximately 15 psi is optimal for the low-pressure sprays.

The entire time to complete cleaning in the automated mode is half that of the conventional, prior art method. This time savings allows a cleaning to be done in the middle of the day, between shifts for instance. Furthermore, this invention allows a sanitizer (perhaps a third type thereof) to be continuously sprayed on the belts during normal operation. Additionally, because the present system requires only a minimum of one revolution of each belt per cycle, as compared to five in the prior art method, the present system uses significantly less water and chemical than the conventional method, even though the spray bars 60, 60a may have a significantly higher water consumption rate than the hoses used in the prior art manual method. Actual water consumption can of course be calculated by multiplying the consumption rate per belt revolution by the number of revolutions.

In the alternative sequential mode, the operator instructs the SCADA 94 to commence each phase individually (i.e., rinsing, covering, sanitizing). After each individual phase is completed the system pauses until the operator indicates that he or she wishes to proceed.

It is preferable following the sanitizing phase to purge the nozzles and spray bars of any remaining liquid. This is accomplished at the direction of the SCADA 94 by the zone PLC's 47 using the compressed air supply for the plant.

The present invention is suitable for retrofit on a wide variety of conveyor systems. In particular, the present system seems well suited for the 100, 200, 300, 400, 800, 900, 1800, 2000, and 2200 series Intralox® acetal conveyor belts (flattop, nub top, and cleated) from the Laitram Corporation of New Orleans, La. It will also work with Volda and Diamond Back PVC conveyor belts, as well as polymer or steel slat conveyor belts and many other varieties. It is also possible to factory install components for the present system in the conveyor system.

In practice, a quality control inspection is then performed to insure that remaining level of bacteria on the conveyor equipment is within safe levels typically regulated by the government. If the bacteria levels exceed safe levels, the entire cleaning process must be repeated for that conveyor. Initial testing has shown that the present system requires recleaning 40% less often than the conventional, prior art method.

Optionally, the present system allows for logging of certain information that the prior art method cannot easily accommodate. For instance, the SCADA 94 can keep a log of how much water is consumed in the process, as well as quantities for each of the chemicals, and other operating parameters. Furthermore, for inspectors' use, it can record the water temperature for each cleaning cycle and the type of sanitizer that was used on a given day, etc.

While the foregoing is directed to the preferred embodiments of the present invention, other and further embodiments of the invention may be devised without departing from the basic scope thereof, and the scope thereof is determined by the claims, which follow.

We claim:

1. An automated cleaning system for a conveyor having a belt comprising:
    a central control unit;
    at least one batch tank;
    a chemical integration platform operatively linked to and controllable by said control unit where said chemical integration platform is operable to selectively receive bulk chemicals and selectively dilute and cause diluted chemicals to be selectively stored in said at least one batch tank;
    at least one manifold station operatively linked to and controllable by said control unit and where said manifold station is in fluid communication with said chemical integration platform and where said manifold station is operable to control fluid flow from the chemical integration platform to at least one spray bar in fluid communication therewith; and
    at least one programmable logic controller operatively coupled to each of said chemical integration platform and said manifold station for controlling said manifold station and said chemical integration platform operations and said programmable logic controller further operatively coupled to said central control unit.

2. The automated cleaning system for a conveyor having a belt as recited in claim 1 where said spray bar further comprises:
    an inlet line in fluid communication with said manifold station; and
    an upper and lower leg portion of the spray bar formed such that the upper and lower leg portions are adapted to straddle a conveyor belt, where said inlet line is operably connected to the upper and lower leg portions to channel fluid to the upper and lower leg portions.

3. The automated cleaning system for a conveyor having a belt as recited in claim 2 where said upper and lower leg portions have at least one nozzle angled such that when installed on a conveyor the angle directs fluid exiting therefrom against the direction of movement of the belt creating a cutting effect.

4. The automated cleaning system for a conveyor having a belt as recited in claim 3 where said upper and lower leg portions are offset such that when installed on a conveyor the lower leg portion is offset downstream from the upper leg portion in relation to the belt travel.

5. The automated cleaning system for a conveyor having a belt as recited in claim 3 where said upper and lower leg portions are offset such that when installed on a conveyor the upper leg portion is offset downstream from the lower leg portion in relation to the belt travel.

6. The automated cleaning system for a conveyor belt as recited in claim 2 further comprising:
    a conveyor, where said spray bar straddles the belt disposed along the conveyors underside position.

7. The automated cleaning system for a conveyor belt as recited in claim 1 where said at least one manifold station is a plurality of manifold stations dividing the automated cleaning system into separate zones in a plant and where said at least one programmable logic controller is a plurality of programmable logic controllers where each of said plurality of manifold stations is operatively coupled to and controlled by at least one of said plurality of programmable logic controllers.

8. The automated cleaning system for a conveyor belt as recited in claim 1 where said at least one manifold station is further in fluid communication with a cleat cleaning spray bar having at least one nozzle obliquely angled such that when installed on the conveyor, the nozzle is angled in relation to the conveyor belt where said oblique angle is optimized for cleat cleaning.

9. The automated cleaning system for a conveyor belt as recited in claim 1 further comprising:

a belt lifter operable to selectively lift the upper portion of the belt from its normal operating position and operable to selectively return the upper portion of the belt to its normal operating position where said belt lifter is operably linked to and controlled by said central control unit.

10. The automated cleaning system for a conveyor belt as recited in claim 1 further comprising:

a belt constrainer operable to selectively hold down the belt during cleaning and said constrainer operably linked to and controlled by said central controller.

11. A method of cleaning a conveyor, comprising the steps of:

providing a central control unit;

providing at least one batch tank;

providing a chemical integration platform operatively linked to and controllable by said control unit and where said chemical integration platform is operable to selectively receive bulk chemicals and selectively dilute and cause diluted chemicals to be selectively stored in at least one batch tank and where fluid from said chemical integration platform is adapted for rinsing and sanitizing and said chemical integration platform further operatively linked to at least one spray bar having a plurality of nozzles directed toward at least one side of the conveyor belt;

rinsing the conveyor belt with the spray bar using fluid retrieved from the at least one batch tank by the chemical integration platform responsive to an operator input at the control unit;

lifting the upper portion of the belt from its normal operating position with lifting arms operatively linked to said control unit such that components under the belt and aprons surrounding the belt are accessible;

rinsing with fluid retrieved from the at least one batch tank by the chemical integration platform and cleaning components under the belt and aprons surrounding the belt manually; and returning the upper portion of the conveyor belt to its normal operating position.

12. The method of cleaning a conveyor as recited in claim 11 further comprising the step of:

providing at least one programmable logic controller operatively linked between said control unit and said chemical integration platform and said at least one spray bar.

13. The method of cleaning a conveyor as recited in claim 11 further comprising the step of:

rinsing a plurality of conveyor cleats with a cleat cleaning spray bar with fluid retrieved from the at least one batch tank by the chemical integration platform where said cleat cleaning spray bar has at least one nozzle obliquely angled in relation to the conveyor belt and where said oblique angle is optimized for cleat cleaning.

14. The method of cleaning a conveyor as recited in claim 11 further comprising the step of:

purging the at least one spray bar and nozzles and all fluid communication lines between the chemical integration platform and the at least one spray bar.

* * * * *